(12) United States Patent (10) Patent No.: US 12,346,194 B2
Xia et al. (45) Date of Patent: Jul. 1, 2025

(54) FAULT PREDICTION SYSTEM BASED ON SENSOR DATA ON NUMERICAL CONTROL MACHINE TOOL AND METHOD THEREFOR

(71) Applicant: JIANGSU NANGAO INTELLIGENT EQUIPMENT INNOVATION CENTER CO., LTD., Nanjing (CN)

(72) Inventors: Zhijie Xia, Alpharetta, GA (US); Zhisheng Zhang, Jiangsu (CN)

(73) Assignee: JIANGSU NANGAO INTELLIGENT EQUIPMENT INNOVATION CENTER CO., LTD., Nanjing (CN)

( * ) Notice: Subject to any disclaimer, the term of this patent is extended or adjusted under 35 U.S.C. 154(b) by 586 days.

(21) Appl. No.: 17/762,086

(22) PCT Filed: Dec. 30, 2019

(86) PCT No.: PCT/CN2019/130026
§ 371 (c)(1),
(2) Date: Mar. 21, 2022

(87) PCT Pub. No.: WO2021/134253
PCT Pub. Date: Jul. 8, 2021

(65) Prior Publication Data
US 2022/0350691 A1 Nov. 3, 2022

(51) Int. Cl.
*G06F 11/07* (2006.01)
*B23Q 17/09* (2006.01)
(Continued)

(52) U.S. Cl.
CPC ...... *G06F 11/0754* (2013.01); *B23Q 17/0957* (2013.01); *G05B 19/4063* (2013.01);
(Continued)

(58) Field of Classification Search
CPC ............ G05B 23/0221; G05B 23/0283; G05B 19/4063; G06F 11/0736; G06F 11/0754
(Continued)

(56) References Cited

U.S. PATENT DOCUMENTS

2016/0313216 A1* 10/2016 Pal ..................... B23Q 17/0971
2019/0265673 A1* 8/2019 Satou ................. B23Q 17/0971
(Continued)

OTHER PUBLICATIONS

Using Machine Learning to Monitor Rotating Machines (Year: 2020).*

*Primary Examiner* — John H Le
(74) *Attorney, Agent, or Firm* — Andrew C. Cheng

(57) ABSTRACT

A fault prediction system based on sensor data on a numerical control machine tool and a method therefor. The fault prediction system includes a plurality of sensors for collecting numerical control machine tool operation state data serving as multi-channel data, wherein an output end of a sensor is connected to an input end of a multi-channel sensor interface circuit, and an output end of the multi-channel sensor interface circuit is connected to a controller. The plurality of sensors can be multi-path temperature sensors, multi-path vibration sensors or multi-path noise sensors. The defects in the prior art of there being no model for researching a cross correlation of multi-channel data, collected by a plurality of sensors, of an operation state of a numerical control machine tool, and a device fault subspace of the multi-channel data being unable to be obtained are effectively prevented.

8 Claims, 1 Drawing Sheet

(51) Int. Cl.
 *G05B 19/4063* (2006.01)
 *G05B 23/02* (2006.01)
(52) U.S. Cl.
 CPC ..... *G05B 23/0221* (2013.01); *G05B 23/0283* (2013.01); *G06F 11/0736* (2013.01); *G05B 2219/34477* (2013.01)
(58) Field of Classification Search
 USPC ........................................................ 702/185
 See application file for complete search history.

(56) References Cited

U.S. PATENT DOCUMENTS

2022/0009049 A1\* 1/2022 Liu .................... G05B 19/4065
2022/0011763 A1\* 1/2022 Negri ................. G05B 23/0283
2022/0410332 A1\* 12/2022 Sakurai ............... G05B 23/024

\* cited by examiner

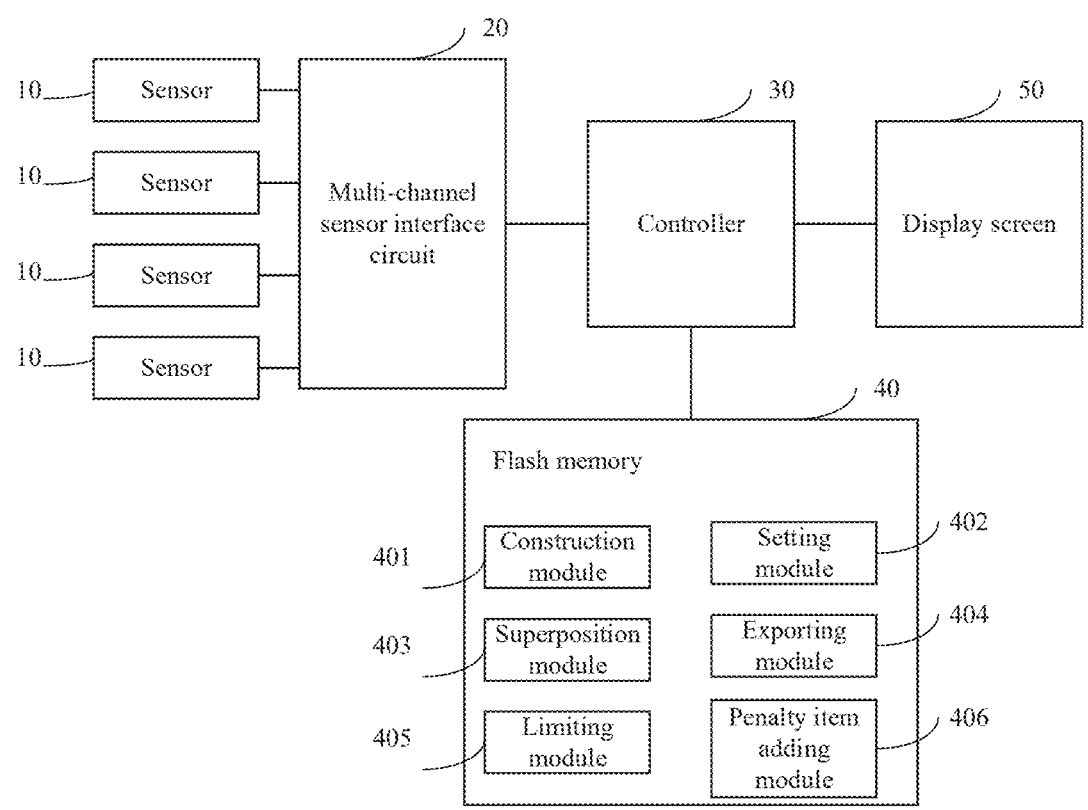

FAULT PREDICTION SYSTEM BASED ON SENSOR DATA ON NUMERICAL CONTROL MACHINE TOOL AND METHOD THEREFOR

CROSS REFERENCE TO RELATED APPLICATION

The present application is based on and claims priority of PCT application No. PCT/CN2019/130026, filed on Dec. 30, 2019. The entire disclosure of the above-identified application, including the specification, drawings and claims are incorporated herein by reference in its entirety.

TECHNICAL FIELD

The present invention relates to the technical field of numerical control machine tools, and also belongs to the technical field of sensors, in particular to a fault prediction system and method based on sensor data on a numerical control machine tool, and in particular to a fault prediction system and method therefor based on multi-channel data of sensors on a numerical control machine tool.

BACKGROUND

CNC lathes are one of the most widely used CNC machine tools. It is mainly used for cutting inner and outer cylindrical surfaces of shaft parts or disc parts, inner and outer conical surfaces with arbitrary cone angles, complex rotating inner and outer curved surfaces, cylinders, and conical threads. It can also perform grooving, drilling, reaming, and reaming and so on.

The CNC machine tool automatically processes the processed parts according to the pre-programmed processing program. We compile the machining process route, process parameters, tool motion trajectory, displacement, cutting parameters and auxiliary functions of the parts into a machining program list according to the instruction code and program format specified by the CNC machine tool, and then record the contents of the program list on the control medium, it is then input into the numerical control device of the numerical control machine tool to direct the machine tool to process the parts.

In other words, a CNC machine tool is an automated machine tool equipped with a program control system that can logically process a program with control codes or other symbolic instructions, decode it, and express it with coded numbers, and then input into the numerical control device through information carrier. After arithmetic processing, the numerical control device sends out various control signals to control the action of the machine tool, and automatically process the parts according to the shape and size required by the drawing.

In order to understand the working status of the CNC machine tool, multiple sensors are set on the CNC machine tool to collect the operating status of the CNC machine tool. In this way, the data collected on the operating status of the CNC machine tool forms multi-channel data. State data usually has heterogeneous characteristics, and there is potential cross-correlation between data. This correlation sometimes changes with time or the state of the CNC machine tool. However, there is currently no data collected for the multiple sensors to collect the operating status of the CNC machine tool. The model for studying the cross-correlation of channel data cannot obtain the equipment fault subspace of multi-channel data.

SUMMARY

In order to solve the above-mentioned problems, the present invention provides a fault prediction system and method based on sensor data on a numerically controlled machine tool, which effectively avoids the prior art that has no model for researching the cross-correlation of the multi-channel data collected by a plurality of sensors on the operating state of the numerical control machine tool, and unable to get device failure subspace for multi-channel data.

In order to overcome the deficiencies in the prior art, the present invention provides a solution to a fault prediction system and method based on sensor data on a numerically controlled machine tool, as follows:

a fault prediction system based on sensor data on a numerically controlled machine tool, including a plurality of sensors for collecting data on the running state of the numerical control machine tool as multi-channel data;

an output end of the sensor is connected to an input end of a multi-channel sensor interface circuit, and an output end of the multi-channel sensor interface circuit is connected to a controller;

the controller is also connected to a flash memory, and the flash memory comprises a construction module, a setting module, a superposition module, an exporting module, a limiting module, and a penalty item adding module.

The controller can be a single-chip microcomputer, PLC, FPGA processor or ARM processor.

The multiple sensors can be multiple temperature sensors, multiple vibration sensors or multiple noise sensors;

the multiple temperature sensors are dispersedly installed on a temperature measurement portion on the numerical control machine tool; the multi-channel vibration sensors are dispersedly installed on a rotor of a servo motor of the numerical control machine tool, and the multiple noise sensors are dispersedly installed on a processing cutter of the numerical control machine tool;

the number of the plurality of sensors is p, and p is a positive integer greater than or equal to 2, and data collected by each sensor and transmitted to the controller is regarded as one channel data of the multi-channel data.

The controller is also connected to the display screen.

wherein the construction module is configured to form received p-channel data into tensor-data-one of the p-channel, the tensor-data-one of the p-channel comprises n sample data collected by the plurality of sensors, and each sample data comprises data collected by the plurality of sensors at a certain sampling time, and data format of the i-th sample data Yi(t) is: $Y_i(t) = [Y_{i1}(t), \ldots, Y_{ip}(t)]$, t is the sampling time of the i-th sample data; Yi(t) can be expressed by formula (1):

$$Y_{ij}(t) = X_{ij}(t) + \varepsilon_{ij}(t) \quad (1)$$

$X_{ij}(t)$ is a signal function of the collected data of the jth channel, $\varepsilon_{ij}(t)$ is a noise function of the collected data of the jth channel, i is a positive integer less than or equal to N, j is a positive integer less than or equal to p, $Y_{ij}(t)$ represents the collected data of the j-th channel at a sampling time t;

the setting module is configured to set data format of the tensor-data-two $X_i(t)$ of the p channel as: $X_i(t) = [X_{i1}(t), \ldots, X_{ip}(t)]$, and the data format of the tensor-data-two $X_i(t)$ of the p channel is divided into L sample subspaces Sl, l=1, 2, . . . , L, L is a positive integer, in the same sample subspace, there is cross-correlation between the signal functions representing each signal, the signal functions of each signal in different sample subspaces have no correlation;

the superposition module is configured to set each sample subspace Sl as a linear superposition of Φl: Φl=[Φl1(t) . . . , Φldl(t)] of dl basis functions, as shown in formula (2):

$$Sl \triangleq \left\{ X(t) \middle| X(t) = \sum_{q=1}^{dl} a_q \phi lq(t),\ a_q \in R \right\} \quad (2)$$

for all signal functions Xij(t), i=1, . . . , N, the sample subspace to which Xij(t) belongs remains unchanged, while the basis coefficients αij=[αij1, αij2 . . . , αijdl] corresponding to Xij(t) are different, and αijk is the k-th component of the basis coefficient αij, where k is a positive integer less than or equal to di;

use Xl={Xj(t)|Xj(t)∈Sl, j=1, . . . , p} to represents the signals of the respective sample subspaces, wherein q and dl are both positive integers, and ag is a set real number, R is the set of real numbers;

the exporting module is configured to obtain the formula (3) for each signal Xij(t)∈Xl, according to the self-expression property of data that each data point in the sample subspace can be jointly represented by other data points in the data set:

$$X_{ij}(t) = \sum_{x_{ir}(t) \in x_l} b_{jr} X_{ir}(t) \quad (3)$$

that is, Xij(t) is a signal function in Xl, which can be expressed as a linear combination of other pl−1 signals in this sample subspace, r is a positive integer, and bjr is the rth component of a sparse coefficient;

the limiting module is configured to limit solution set by using the Lq norm to minimize an objective function for the solution of the sparse coefficient bj;

the penalty item adding module is configured to set that the collected data of the j-th channel has a total of S'−1 change points τs, s=1, . . . , S'−1, for each change point as a dividing point, as in the formula (6) Shown:

$$Y_{ij}^s(t) = X_{ij}^s(t) + \varepsilon_{ij}(t) \quad (6)$$

among them, $X_{ij}^s(t)$ is a signal function of the change point τs of the j-th channel, εij(t) is a noise function of the collected data of the j-th channel, i is a positive integer less than or equal to N, j is a positive integer less than or equal to p, $Y_{ij}^s(t)$ represents the change point τs of the j-th channel at the sampling time t, a penalty term is added to the sparsity coefficient bj, and S' is a positive integer.

The method for a fault prediction system based on sensor data on a numerically controlled machine tool, which runs on a controller, includes the following steps:

Step 1: a plurality of sensors transmitting collected p-channel data to the controller through a multi-channel sensor interface circuit, and the controller converting a received p-channel data into tensor-data-one of the p-channel, the tensor-data-one of the p-channel comprising n sample data collected by the plurality of sensors, each sample data comprising data collected by the plurality of sensors at a certain sampling time, and wherein data format of the i-th sample data Yi(t) being: Yi(t)=[Yi1(t), . . . , Yip(t)], t is the sampling time of the i-th sample data; Yi(t) can be expressed by formula (1):

$$Yij(t) = Xij(t) + \varepsilon ij(t) \quad (1)$$

Xij(t) is a signal function of the collected data of the jth channel, εij(t) is a noise function of the collected data of the jth channel, i is a positive integer less than or equal to N, j is a positive integer less than or equal to p, Yij(t) represents the collected data of the j-th channel at a sampling time t;

Step 2: setting the data format of a tensor-data-two of the p channel Xi(t) as: Xi(t)=[Xi1(t), . . . , Xip(t)], wherein the tensor-data-two of the p channel Xi(t) is divided into L sample subspaces Sl, l=1, 2, . . . , L, L is a positive integer, in the same sample subspace, the signal functions representing each signal have cross-correlation, the signal functions of each signal in different sample subspaces have no correlation;

Step 3: setting each sample subspace Sl as a linear superposition of Φl: Φl=[Φl1(t), . . . , Φldl(t)] of dl basis functions, as shown in formula (2):

$$Sl \triangleq \left\{ X(t) \middle| X(t) = \sum_{q=1}^{dl} aq \phi lq(t),\ aq \in R \right\} \quad (2)$$

for all signal functions Xij(t), i=1, . . . , N, the sample subspace to which Xij(t) belongs remains unchanged, while the basis coefficients corresponding to Xij(t) are different, and αijk is the k-th component of the basis coefficient αij, where k is a positive integer less than or equal to dl;

use Xl={Xj(t)|Xj(t)∈Sl, j=1, . . . , p} to represent the signals of the respective sample subspaces, wherein q and dl are both positive integers, and αq is a set real number, R is the set of real numbers, Step 4: obtaining formula (3) for each signal Xij(t)∈Xl, according to the self-expression property of data that each data point in the sample subspace can be jointly represented by other data points in the data set:

$$X_{ij}(t) = \sum_{x_{ir}(t) \in x_l} b_{jr} X_{ir}(t) \quad (3)$$

that is, Xij(t) is a signal function in Xl, which can be expressed as a linear combination of other pl−1 signals in this sample subspace, r is a positive integer, and bjr is the rth component of a sparse coefficient;

Step 5: using the Lq norm to minimize an objective function to limit solution set for solution of the sparse coefficient bj;

the restriction conditions for using the Lq norm to minimize the objective function to limit the solution set for the solution of the sparse coefficient bj are as shown in the formula group (4):

$$\min \|b_j\|_q \quad (4)$$

subject to $X_{ij}(t) = X_i(t) b_j$, $b_{jj} = 0$ wherein q is the set integer value, which can take the value 1;

using convex programming tools such as the formula (5) group to effectively solve the sparse coefficient bj, s in the formula (5) group is a sampling time after the time t:

$$\min\|b_j\|_1 + \frac{1}{2}\sum_{i=1}^{N}\int Z_{ij}(t)\Gamma_j(t,s)^{-1}Z_{ij}(s)dtds \qquad (5)$$

subject to $Z_{ij}(t)=Y_{ij}(t)=Y_i(t)b_j$, $b_{jj}=0$

In this way, the sparsity coefficients bj can be obtained, j=1, ..., p;

Step 6: setting the collected data of the j-th channel has a total of S'−1 change points τs, S=1, ..., S'−1, for each change point as a dividing point, as in the formula (6) Shown:

$$Y_{ij}^{s}(t)=X_{ij}^{s}(t)+\varepsilon_{ij}(t) \qquad (6)$$

among them, $X_{ij}^{s}(t)$ is a signal function of the change point τs of the j-th channel, εij(t) is a noise function of the collected data of the j-th channel, i is a positive integer less than or equal to N, j is a positive integer less than or equal to p, $Y_{ij}^{s}(t)$ represents the change point τs of the j-th channel at the sampling time t, a penalty term is added to the sparsity coefficient bj, and S' is a positive integer.

the restriction conditions for using the Lq norm to minimize the objective function to limit the solution set for the solution of the sparse coefficient bj are as shown in the formula group (4):

$$\min\|b_j\|_q \qquad (4)$$

subject to $X_{ij}(t)=X_i(t)b_j, b_{jj}=0$ wherein q is the set integer value, which can take the value 1;

using convex programming tools such as the formula (5) group to effectively solve the sparse coefficient bj, s in the formula (5) group is a sampling time after the time t;

$$\min\|b_j\|_1 + \frac{1}{2}\sum_{i=1}^{N}\int Z_{ij}(t)\Gamma_j(t,s)^{-1}Z_{ij}(s)dtds \qquad (5)$$

subject to $Z_{ij}(t)=Y_{ij}(t)=Y_i(t)b_j$, $b_{jj}=0$

In this way, the sparsity coefficients bj can be obtained, j=1, ..., p, so that the sparse coefficient b j that reflects the cross-correlation performance of multi-channel data can be obtained;

the method of adding a penalty term to the sparsity coefficient bj is in the combined fusion LASSO as expressed in formula (7), λ1 is the coefficient one of the set penalty term, and λ2 is the coefficient two of the set penalty term:

$$\min\lambda_1\int\left\|\frac{db_j(t)}{dt}\right\|_1 dt + \lambda_2\int\|b_j(t)\|_1 dt + \frac{1}{2}\sum_{i=1}^{N}\int Z_{ij}(t)\Gamma_j(t,s)^{-1}Z_{ij}(s)dtds, \qquad (7)$$

subject to $Z_{ij}(t) = Y_{ij}(t) - Y_i(t)b_j$, $b_{jj} = 0$ as a result, dynamic modeling of the subspace correlation of the samples can be obtained and the modeling information can be displayed on the display screen.

The beneficial effects of the present invention are:

By finally using convex programming tools to effectively solve the sparse coefficient bj, the sparse coefficient bj reflecting the cross-correlation performance of the multi-channel data can be obtained, and the cross-correlation of the multi-channel data collected by the multiple sensors on the operating state of the CNC machine tool can be formed. The researched model avoids the defects of the model in the prior art that has not been researched on the cross-correlation of the multi-channel data of the running state of the numerical control machine tool collected by the multiple sensors. Using the formula of FISTA accelerated optimization combined with norm constraints, the convergence speed of FISTA is O(1/k2). Combining FISTA and sparse subspace, a new optimization target formula is obtained, and a more rapid convergence optimization model is obtained, which can greatly improve the solution speed of the optimization formula, which is convenient for real-time equipment failure prediction.

BRIEF DESCRIPTION OF THE DRAWINGS

FIG. 1 is an overall schematic diagram of a fault prediction system based on sensor data on a numerically controlled machine tool of the present invention.

DETAILED DESCRIPTION OF PREFERRED EMBODIMENTS

The present invention will be further described below with reference to the drawings and embodiments.

As shown in FIG. 1, the fault prediction system based on sensor data on a numerically controlled machine tool includes a plurality of sensors 10s for collected data on the running state of the numerical control machine tool as multi-channel data; an output of the sensor is connected to an input end of a multi-channel sensor interface circuit 20. The controller 30 can be a single-chip microcomputer, a PLC, an FPGA processor or an ARM processor. The plurality of sensors 10s can be multiple temperature sensors 10s, multiple vibration sensors 10s, or multiple noise sensors 10s; the multiple temperature sensors 10s are dispersedly installed on a temperature measurement portion on the numerical control machine tool; the multi-channel vibration sensors 10s are dispersedly installed on a rotor of a servo motor of the numerical control machine tool, and the multiple noise sensors 10s are dispersedly installed on a processing cutter of the numerical control machine tool; the number of the plurality of sensors 10s is p, and p is a positive integer greater than or equal to 2, and data collected by each sensor and transmitted to the controller 30 is regarded as one piece of channel data. The controller 30 is also connected to a display screen. The controller 30 is also connected to a flash memory 40, and the flash memory 40 includes a construction module 401, a setting module 402, a superposition module 403, an exporting module 404, and a limiting module 405; the construction module 401 is configured to form the received p-channel data into tensor-data-one of the p-channel, the tensor-data-one of the p-channel includes n sample data collected by the plurality of sensors 10s, each sample data includes data collected by the plurality of sensors 10s at a certain sampling time, and data format of the i-th sample data Yi(t) is: Yi(t)=[Yi1(t), ..., Yip(t)], t is the sampling time of the i-th sample data; Yi(t) can be expressed by formula (1):

$$Yij(t)=Xij(t)+\varepsilon ij(t) \qquad (1)$$

Xij(t) is a signal function of the collected data of the jth channel, εij(t) is an independent noise function of the collected data of the jth channel, i is a positive integer less than or equal to N, j is a positive integer less than or equal to p, Yij(t) represents the collected data of the j-th channel at the sampling time t;

the setting module 402 is configured to set the data format of the tensor-data-two Xi(t) of the p channel as: Xi(t)=[Xi1(t), ..., Xip(t)], and the data format of the tensor-data-two Xi(t) of the p channel can be divided into L different sample subspaces Sl, l=1, 2, ..., L, L is a positive integer, in the same sample subspace, there is strong cross-correlation between the signal functions representing each signal, the signal functions of each signal in different sample subspaces have almost no correlation;

The superposition module 403 is configured to set each sample subspace Sl as a linear superposition of Φl::Φl=[Φl1(t), ..., Φldl(t)] of dl basis functions, as shown in formula (2):

$$Sl \triangleq \left\{ X(t) \middle| X(t) = \sum_{q=1}^{dl} a_q \phi lq(t), a_q \in R \right\} \quad (2)$$

For all signal functions Xij(t), i=1, ..., N, the sample subspace to which Xij(t) belongs remains unchanged, while the basis coefficients αij=[αij1, αij2 ..., αijdl] corresponding to Xij(t) are different, and αijk is the k-th component of the basis coefficient αij, where k is a positive integer less than or equal to dl;

Xl={Xj(t)|Xj(t)=Sl, j=1, ... p} can be used to represent the signal of each sample subspace, wherein q and dl are both positive integers, and αq is a set real number, R is the set of real numbers;

the exporting module 404 is configured to obtain the formula (3) for each signal Xij(t)∈Xl, according to the self-expression property of data that each data point in the sample subspace can be jointly represented by other data points in the data set:

$$X_{ij}(t) = \sum_{X_{ir}(t) \in X_l} b_{jr} X_{ir}(t) \quad (3)$$

That is, Xij(t) is a signal function in Xl, which can be expressed as a linear combination of other pl−1 signals in this sample subspace, r is a positive integer, and bjr is the rth component of the sparse coefficient;

The limiting module 405 is configured to limit the solution set by using the Lq norm to minimize the objective function for the solution of the sparse coefficient bj.

The method for the modeling system for collected data of sensors 10s on the numerical control machine tool, which runs on the controller 30, includes the following steps:

Step 1: the plurality of sensors 10s transmitting the collected p-channel data to the controller 30 through the multi-channel sensor interface circuit 20, and the controller 30 converting the received p-channel data into tensor-data-one of the p-channel, the tensor-data-one of the p-channel including n sample data collected by the plurality of sensors 10s, each sample data including data collected by the plurality of sensors 10s at the certain sampling time, and wherein the data format of the i-th sample data Yi(t) is: Yi(t)=[Yi1(t), ..., Yip(t)], t is the sampling time of the i-th sample data; Yi(t) can be expressed by formula (1):

$$Yij(t)=Xij(t)+\varepsilon ij(t) \quad (1)$$

Xij(t) is the signal function of the collected data of the jth channel, εij(t) is the noise function of the collected data of the jth channel, i is the positive integer less than or equal to N, j is the positive integer less than or equal to p, Yij(t) represents the collected data of the j-th channel at the sampling time t;

Step 2: Setting the data format of the tensor-data-two of the p channel Xi(t) as: Xi(t)=[Xi1(t) ..., Xip(t)], wherein the tensor-data-two of the p channel Xi(t) can be divided into L different sample subspaces Sl, l=1, 2, ..., L, L is the positive integer, in the same sample subspace, the signal functions representing each signal have strong cross-correlation, the signal functions of each signal in different sample subspaces have almost no correlation;

Step 3: setting each sample subspace Sl as the linear superposition of Φl: Φl=[Φl1(t), ..., Φldl(t)] of dl basis functions, as shown in formula (2):

$$Sl \triangleq \left\{ X(t) \middle| X(t) = \sum_{q=1}^{dl} a_q \phi lq(t), a_q \in R \right\} \quad (2)$$

for all signal functions Xij(t), i=1, ..., N, the sample subspace to which Xij(t) belongs remains unchanged, while the basis coefficients corresponding to Xij(t) are different, and αijk is the k-th component of the basis coefficient αij, where k is the positive integer less than or equal to dl;

Use Xl={Xj(t)|Xj(t)∈Sl, j=1, ..., p} to represent the signals of the respective sample subspaces, wherein q and dl are both positive integers, and αq is the set real number, R is the set of real numbers;

Step 4: obtaining formula (3) for each signal Xij(t)∈Xl, according to the self-expression property of data that each data point in the sample subspace can be jointly represented by other data points in the data set:

$$X_{ij}(t) = \sum_{X_{ir}(t) \in X_l} b_{jr} X_{ir}(t) \quad (3)$$

that is, Xij(t) is the signal function in Xl, which can be expressed as the linear combination of other pl−1 signals in this sample subspace, r is the positive integer, and bjr is the rth component of the sparse coefficient;

Step 5: the sparse coefficient bj may have infinitely many solutions, but the Lq norm can be used to minimize the objective function to limit the solution set for the solution of the sparse coefficient bj.

Step 6: In the above steps, the sparse coefficient is obtained, and the static sample subspace segmentation based on the sparse subspace is realized. In some application scenarios, the correlation between signal channels will change with time t, and their cross-correlation structure usually remains unchanged for a certain period of time. When the system is subject to some external interference, it will become another constant. status. The cross-correlation only changes gradually at a certain point in time.

It is set that the collected data of the j-th channel has a total of S'−1 change points TS, s=1, ..., S'−1, for each change point as a dividing point, as shown in formula (6):

$$Y_{ij}^s(t)=X_{ij}^s(t)+\varepsilon_{ij}(t) \quad (6)$$

among them, $X_{ij}^s(t)$ is a signal function of the change point τs of the j-th channel, εij(t) is a noise function of the collected data of the j-th channel, i is a positive integer less than or equal to N, j is a positive integer less than or equal to p, $Y_{ij}^s(t)$ represents the change point τs of the j-th channel at the sampling time t, a penalty term is added to the sparsity coefficient bj, and S' is a positive integer.

wherein the restriction conditions for using the Lq norm to minimize the objective function to limit the solution set for the solution of the sparse coefficient bj are as shown in the formula group (4):

$$\min\|b_j\|_q \quad (4)$$

subject to $X_{ij}(t)=X_i(t)b_j$, $b_{jj}=0$

Wherein q is the set integer value, which can take the value 1;

different choices of q have different effects on the solution of the sparsity coefficient bj. Generally, by reducing the value of q from infinity to zero, the sparsity of the solution will increase. To efficiently find the sparse representation of Xij(t) under the non-trivial process in Xi(t), consider the strict convex relaxation that minimizes the L0 norm, that is, the L1 norm, this can be done, using convex programming tools such as the formula (5) group to effectively solve the sparse coefficient bj, s in the formula (5) group is a sampling time after the time t:

$$\min\|b_j\|_1 + \frac{1}{2}\sum_{i=1}^{N}\int Z_{ij}(t)\Gamma_j(t,s)^{-1}Z_{ij}(s)dtds \quad (5)$$

subject to $Z_{ij}(t)=Y_{ij}(t)-Y_i(t)b_j$, $b_{jj}=0$

In this way, the sparsity coefficient bj can be obtained, j=1, . . . , p, and in this way, the sparsity coefficient bj reflecting the cross-correlation performance of the multi-channel data can be obtained.

The method of adding a penalty term can executed by a penalty item adding module 406 to the sparsity coefficient bj is in the combined fusion LASSO as expressed in formula (7) to improve its local stability, λ1 is the coefficient one of the set penalty term, and λ2 is the coefficient two of the set penalty term:

$$\min\lambda_1 \int \left\|\frac{db_j(t)}{dt}\right\|_1 dt + \lambda_2 \int \|b_j(t)\|_1 dt + \frac{1}{2}\sum_{i=1}^{N}\int Z_{ij}(t)\Gamma_j(t,s)^{-1}Z_{ij}(s)dtds, \quad (7)$$

subject to $Z_{ij}(t) = Y_{ij}(t) - Y_i(t)b_j$, $b_{jj} = 0$ subject to $Z_{ij}(t)=Y_{ij}(t)-Y_i(t)b_j$, $b_{jj}=0$ as a result, dynamic modeling of the subspace correlation of the samples can be obtained and the modeling information can be displayed on the display screen, so that the equipment fault subspace of the dynamic multi-channel data can be calculated.

On the other hand, in order to facilitate remote monitoring, the controller 30 is often connected to the TD-LTE module, and transmits the transmitted modeling information to the monitoring equipment connected to the TD-LTE network, and configures it for monitoring personnel to display. The monitoring equipment can be a PC or a laptop, so as to achieve the purpose of remote monitoring and modeling information. However, in practical applications, the TD-LTE network can only be used for the TD-LTE network during the period in which the modeling information is transmitted. If the information is transmitted in the TD-LTE network due to relocation or location distance, then the controller 30 and monitoring equipment that use the TD-LTE network to model information transmission are not far away, just like signals are transmitted in the BLUETOOTH network, during the use of the TD-LTE network, the controller 30 connected to the TD-LTE module cannot actively activate the BLUETOOTH network to facilitate and efficiently transmit a large number of information streams such as modeling information, but still use part of the current TD-LTE network for transmission; Under the circumstance that the information transmission speed of the existing TD-LTE network is not high, the transmission speed of a large amount of information flow such as modeling information is not fast, and the transmission speed of this large amount of information flow is low, which is not conducive to monitoring by monitoring personnel.

That is to say, the controller 30 and monitoring equipment that use the TD-LTE network to perform modeling information transfer in real time, under the condition that they know that they are not far away from each other, if the existing TD-LTE network is still used between the controller 30 and the monitoring equipment, the LTE network executes the transfer of modeling information, and the transmission speed of the TD-LTE network is limited when transferring a large amount of information flow such as modeling information that needs to be transferred in real time. It is not fast, and the transmission speed is not high; in the face of such defects, an improved information transmission method is proposed after improvement, that is, the controller 30 and monitoring equipment use the TD-LTE network to perform information transmission, knowing that they are not far away from each other, just like In the context of the signaling of the BLUETOOTH network, a BLUETOOTH subnet is constructed between the controller 30 and the monitoring equipment via an intermediate device or by performing performance coordination of the controller 30 and the monitoring equipment with each other, in which the BLUETOOTH subnet does not pass through each other. TD-LTE network performs modeling information transfer, and performs one-to-one modeling information transfer to transfer a large amount of information flow such as modeling information that needs to be transferred in real time, so that the speed of modeling information transfer can be improved.

Specifically, the improved method is described as follows:

The controller 30 is connected to a TD-LTE module, and can transmit modeling information to a monitoring equipment connected to the TD-LTE network and configured for monitoring personnel for display. The monitoring equipment can be a PC or a laptop. The controller 30 is also connected to the first BLUETOOTH communication module, and the monitoring equipment connected to the TD-LTE network and configured for the monitoring personnel is also connected to the second BLUETOOTH communication module, so that the method of the modeling information transferred to the controller 30 is transferred to the monitoring equipment for monitoring personnel includes:

S1-1: the controller 30 and the monitoring equipment configured for the monitoring personnel use a real-time transmission method to perform the transmission of modeling information via the TD-LTE network;

Initially, the controller 30 and the monitoring equipment configured to the monitoring personnel use the mode of real-time information transmission, just as the controller 30 transmits the modeling information to the monitoring equipment configured to the monitoring personnel through the TD-LTE network; during this period, both the controller 30 and the monitoring equipment configured to the monitoring personnel must use the information transmission speed of the TD-LTE network to execute the controller 30 to transmit the modeling information to the monitoring equipment configured to the monitoring personnel;

S1-2: After the controller 30 determines that the monitoring equipment configured to the monitoring personnel can be used to transmit modeling information via the BLUETOOTH subnet, construct an information link between the controller 30 and the monitoring equipment configured to the monitoring personnel through the first BLUETOOTH subnet.

Due to the limitation of the information transmission speed of the TD-LTE network, the information transmission speed between the controller 30 and the monitoring equipment configured for the monitoring personnel is often very low, and the modeling information transmission often fails; the controller 30 can periodically or randomly determine whether the transfer of modeling information and monitoring equipment configured to the monitoring personnel can be performed via other BLUETOOTH subnets, and if determine via the first BLUETOOTH subnet, it can perform the transfer of modeling information with monitoring equipment configured to the monitoring personnel, an information link oriented to the first BLUETOOTH subnet can be constructed between the controller 30 and the monitoring equipment configured to the monitoring personnel.

In the corresponding method of the present invention, the determination can be performed via the first BLUETOOTH subnet and the monitoring equipment configured to the monitoring personnel to perform modeling information transfer, which can be as follows: the controller 30 can detect that the controller 30 and the monitoring equipment configured to the monitoring personnel are located not far away, just like the distance in the scope of the signal transmission of the BLUETOOTH network, constitutes the information link between the controller 30 and the monitoring equipment configured to the monitoring personnel facing the first BLUETOOTH subnet. The controller 30 and the monitoring equipment configured to the monitoring personnel directly performing the transfer of modeling information via the information link and without via the TD-LTE network without; obviously, during the construction of the information link, the controller 30 and the monitoring equipment configured to the monitoring personnel can also continuously perform the transfer of modeling information via the TD-LTE network.

S1-3: When the controller 30 needs to transfer the modeling information to be transfer to the monitoring equipment configured to the monitoring personnel via the real-time modeling information transfer mode, the controller 30 transfers some of the modeling information to the monitoring equipment configured to the monitoring personnel via the information link;

After the controller 30 and the monitoring equipment configured for the monitoring personnel successfully construct an information link for the first BLUETOOTH subnet, when the controller 30 must transfer the modeling information to be transmitted to the monitoring equipment configured for the monitoring personnel via the TD-LTE network, the controller 30 can transfer some of the modeling information to be transferred to the monitoring equipment configured to the monitoring personnel via the newly constructed information link, while the other modeling information is transferred via the TD-LTE network; or it can also transfer all the modeling information to the monitoring equipment configured to the monitoring personnel via the newly constructed information link.

The modeling information to be transmitted in the improved information transmission method.

Naturally, the improved information transmission method can also include, when the monitoring equipment configured to the monitoring personnel needs to transmit the modeling information to be transmitted to the controller 30 via the real-time modeling information transmission mode, the monitoring equipment configured to the monitoring personnel can transfer some modeling information to the controller 30 via an information link.

The improved information transmission method, during the period when the controller 30 and the monitoring equipment configured to the monitoring personnel perform the modeling information transfer via the TD-LTE network using the real-time modeling information transfer mode, if it is determined that the modeling information can be transferred via the first BLUETOOTH subnet, the controller 30 and the monitoring equipment configured to the monitoring personnel construct an information link for first BLUETOOTH subnet, and perform the transfer of the modeling information through the information link, so as not to be affected by the TD-LTE network. The restriction of information transmission speed improves the transmission speed and performance of modeling information, reduces the time for transmitting a large amount of real-time modeling information, improves the performance of monitoring equipment to obtain modeling information, and improves the monitoring level.

In the improved information transmission method, the first BLUETOOTH subnet can be a BLUETOOTH ad hoc network, including a direct network for directly performing modeling information transmission between the controller 30 and the monitoring equipment configured for the monitoring personnel.

Using the BLUETOOTH subnet as an example, the direct network described can be a BLUETOOTH ad hoc network composed of the controller 30 acting as an ad hoc network device and the monitoring equipment configured to the monitoring personnel.

In this improved information transmission method, the controller 30 determines that it can perform modeling information transmission with the monitoring equipment configured to the monitoring personnel via first BLUETOOTH subnet, and then constructs the information Link between the controller 30 and the monitoring equipment configured to the monitoring personnel for first BLUETOOTH subnet can include:

the controller 30 obtains the coordinate information of the monitoring equipment that is configured to the monitoring personnel and is transferred by the monitoring equipment. If it is determined that the monitoring equipment configured to the monitoring personnel is located in the signal transmission category of first BLUETOOTH subnet, it is configured to the monitoring equipment of the monitoring personnel provides first BLUETOOTH subnet and starts the first modeling information transmission method; just like the controller 30 activates the mode function of the BLUETOOTH ad hoc network, it constructs the BLUETOOTH ad hoc network for the monitoring equipment configured to the monitoring personnel, and concurrently start own BLUETOOTH communication module, and then inform the monitoring equipment configured to the monitoring personnel to also start the first modeling information transmission method, which is to start the mode function of the BLUETOOTH ad hoc network, and configure information Link with the monitoring equipment configured to the monitoring personnel; the period of constructing the information link can be carried out according to the existing method; the monitoring equipment configured to the monitoring personnel is provided with a GPS module, and the processor of the monitoring equipment configured to the monitoring personnel is connected to the GPS module.

In addition, the coordinate information of the monitoring equipment configured to the monitoring personnel obtained by the controller 30 can be transmitted to the controller 30 after the monitoring equipment configured to the monitoring personnel detects that the operation of the monitoring personnel meets the set activation conditions. The activation conditions include listening to the modeling information whose volume of modeling information to be transmitted by the user is higher than the set critical number, just like the monitoring personnel pressing the button to obtain the modeling information; after detecting the monitoring personnel pressing the button to obtain the modeling information, the monitoring equipment configured to the monitoring personnel automatically transmitted its coordinate information to the controller 30.

The coordinate information of the monitoring equipment configured to the monitoring personnel obtained by the controller 30 may also be transferred by the monitoring equipment configured to the monitoring personnel, after obtaining the request transmitted by the controller 30 to obtain the coordinate information corresponding to the monitoring equipment configured to the monitoring personnel; in detail, the controller 30 automatically transmits an instruction to obtain coordinate information to the monitoring equipment configured to the monitoring personnel, and the monitoring equipment configured to the monitoring personnel obtains its own coordinate information according to the instruction and transmits it to the controller 30.

In the foregoing method embodiment, the first BLUETOOTH subnet may also include a BLUETOOTH subnet network, such as a wifi network, for transferring modeling information between the controller 30 and the monitoring equipment configured to the monitoring personnel through an intermediate node. When the controller 30 and the monitoring equipment configured for the monitoring personnel are within the scope of the wifi signal transmission provided by the third party, the controller 30 and the monitoring equipment configured for the monitoring personnel can establish an information link by connecting to the wifi network provided by the third party.

In this improved information transmission method, the controller 30 determines that it can perform modeling information transmission via the first BLUETOOTH subnet and the monitoring equipment configured to the monitoring personnel, and then constructs the information Link between the controller 30 and the monitoring equipment configured to the monitoring personnel for the first BLUETOOTH subnet can include:

the controller 30 obtains the coordinate information of the first BLUETOOTH subnet transmitted by the monitoring equipment configured to the monitoring personnel. The monitoring equipment configured to the monitoring personnel is now in the signal transmission category of the first BLUETOOTH subnet. If the controller 30 determines the controller 30 is also in the category of signal transmission of the first BLUETOOTH subnet based on the coordinate information, construct the information link with the monitoring equipment configured for the monitoring personnel; in detail, the monitoring equipment configured for the monitoring personnel will be the coordinates of the first BLUETOOTH subnet where it is currently located. The signal is transmitted to the controller 30, and the controller 30 uses the coordinate information to determine that it is also in the signal transmission category of the first BLUETOOTH subnet, and constructs an information link with the monitoring equipment configured for the monitoring personnel.

In detail, the method of modeling information transmission for the first BLUETOOTH subnet includes:

S2-1: the controller 30 and the monitoring equipment configured to the monitoring personnel use the TD-LTE network to transfer modeling information;

In detail, the controller 30 and the monitoring equipment configured to the monitoring personnel perform the transfer modeling information through the TD-LTE network;

S2-2: the controller 30 detects that the operation of the monitoring personnel meets the set activation conditions;

In detail, the controller 30 detects the monitoring personnel pressing the button to obtain modeling information;

S2-3: the controller 30 obtains its own coordinate information;

In detail, a GPS module is provided on the controller 30, and the GPS module is connected to the controller 30, so that the controller 30 can manipulate the GPS module to obtain its own coordinate information;

S2-4: the controller 30 transmits modeling information to the monitoring equipment configured to the monitoring personnel;

In detail, the controller 30 can deliver the modeling information to the monitoring equipment configured to the monitoring personnel in order to deliver the modeling information.

S2-5: the monitoring equipment configured to the monitoring personnel obtains the information of the controller 30, and based on the coordinate information of the monitoring equipment configured to the monitoring personnel, it is determined whether to activate the own BLUETOOTH communication module;

In detail, the monitoring equipment configured to the monitoring personnel obtains the information of the controller 30, and obtains the coordinate information of the monitoring equipment configured to the monitoring personnel; compare the coordinate information of the controller 30 and the monitoring equipment configured to the monitoring personnel, if it is determined the BLUETOOTH communication modules activated by the controller 30 are in the scope of modeling information transmission, it can allow the monitoring equipment configured to the monitoring personnel to activate its own BLUETOOTH communication module.

S2-6: the monitoring equipment configured to the monitoring personnel transmits feedback messages to the controller 30;

In detail, the monitoring equipment configured to the monitoring personnel transmits feedback messages to the controller 30, and the feedback message includes informing the controller 30 that it is not far away from the monitoring equipment configured to the monitoring personnel and that the monitoring equipment configured to the monitoring personnel has started the BLUETOOTH communication module, as well as the feedback information of the monitoring equipment configured to the monitoring personnel.

S2-7: the controller 30 activates its own BLUETOOTH communication module;

In detail, the controller 30 obtains the feedback message of the monitoring equipment configured to the monitoring personnel, starts its own BLUETOOTH communication module on the controller 30, and uses the feedback information of the monitoring equipment configured to the monitoring personnel to executes the link with the monitoring equipment configured to the monitoring personnel;

S2-8: the controller 30 and the monitoring equipment configured to the monitoring personnel perform negotiation on the performance of modeling information transmission;

In detail, the controller 30 and the monitoring equipment configured to the monitoring personnel both tentatively execute the construction link and perform the modeling information transfer performance negotiation when the BLUETOOTH communication module is activated.

S2-9: the controller 30 transmit modeling information to the monitoring equipment of the monitoring personnel, and perform registration for the modeling information;

In detail, when the controller 30 transmits modeling information to the monitoring equipment configured to the monitoring personnel, the controller 30 uses the constructed information link to transmit the modeling information.

S2-10: the controller 30 transmits modeling information to the monitoring equipment configured to the monitoring personnel via the constructed information link.

The present invention has been described above in the form of illustrative embodiments. Those skilled in the art should understand that the present disclosure is not limited to the above-described embodiments, and various changes and replaces can be made without departing from the scope of the present invention.

What is claimed is:

1. A fault prediction system based on sensor data on a numerically controlled machine tool, comprising a controller, a flash memory and a plurality of sensors for collecting data on a running state of the numerical control machine tool as multi-channel data, a number of the plurality of sensors is p, and p is a positive integer greater than or equal to 2;

it is characterized in that, an output end of each of the sensors is connected to an input end of a multi-channel sensor interface circuit, and an output end of the multi-channel sensor interface circuit is connected to the controller;

the controller is also connected to a flash memory, and the flash memory comprises a construction module, a setting module, a superposition module, an exporting module, a limiting module, and a penalty item adding module, the controller is used to direct a processor to execute the construction module, the setting module, the superposition module, the exporting module, the limiting module, and the penalty item adding module program modules stored in the flash memory;

wherein the construction module is configured to form received p-channel data into tensor-data-one of p-channel, the tensor-data-one of p-channel comprises n number of sample data collected by the plurality of sensors, and each sample data comprises data collected by the plurality of the sensors at a certain sampling time, and data format of i-th sample data Yi(t) is: Yi(t)= [Yi1(t), . . . , Yip(t)], t is sampling time of the i-th sample data; Yi(t) can be expressed by formula (1);

$$Yij(t) = Xij(t) + \varepsilon ij(t) \tag{1}$$

Xij(t) is a signal function of collected data of jth channel, εij(t) is a noise function of the collected data of the jth channel, i is a positive integer less than or equal to N, j is a positive integer less than or equal to p, Yij(t) represents the collected data of the j-th channel at a sampling time t;

the setting module is configured to set data format of tensor-data-two Xi(t) of the p channel as: Xi(t)= [Xi1(t), . . . , Xip(t)], and the data format of the tensor-data-two Xi(t) of the p channel is divided into L sample subspaces Sl, l=1, 2, . . . , L, L is a positive integer, in the same sample subspace, there is cross-correlation between the signal functions representing each signal, the signal functions of each signal in different sample subspaces have no correlation;

the superposition module is configured to set each sample subspace Sl as a linear superposition of Φl: Φl= [Φl1(t), . . . , Φldl(t)] of dl basis functions, as shown in formula (2):

$$Sl \triangleq \left\{ X(t) \big| X(t) = \sum_{q=1}^{dl} a_q \phi lq(t),\, a_q \in R \right\} \tag{2}$$

for all signal functions Xij(t), i=1, . . . , N, the sample subspace to which Xij(t) belongs remains unchanged, while the basis coefficients αij=[αij1, αij2 . . . , αijdl] corresponding to Xij(t) are different, and αijk is k-th component of the basis coefficient αij, where k is a positive integer less than or equal to dl;

wherein Xl={Xj(t)|Xj(t)∈Sl, j=1, . . . , p}, Xl is signal of respective sample subspaces, wherein q and dl are both positive integers, and αq is a set real number, R is a set of real numbers;

the exporting module is configured to obtain the formula (3) for each signal Xij(t)∈Xl:

$$X_{ij}(t) = \sum_{X_{ir}(t) \in X_l} b_{jr} X_{ir}(t) \tag{3}$$

that is, Xij(t) is a signal function in Xl, which can be expressed as a linear combination of other pl−1 signals in this sample subspace, r is a positive integer, and bjr is a rth component of a sparse coefficient bj, wherein the sparse coefficient bj is configured to reflects the cross-correlation performance of the running state data of the numerical control machine tool, to implement equipment failure prediction of the numerically controlled machine tool;

the limiting module is configured to limit solution set by using the Lq norm to minimize an objective function for the solution of the sparse coefficient bj;

the penalty item adding module is configured to set that the collected data of the j-th channel has a total of S'−1 change points τs, s=1, . . . , S'−1, for each change point as a dividing point:

$$Yij^s(t) = Xijs(t) + \varepsilon ij(t) \tag{6}$$

among them, Xij$^s$(b) is a signal function of the change point τs of the j-th channel, εij(t) is a noise function of the collected data of the j-th channel, Xij$^s$ (t) represents the change point τs of the j-th channel at the sampling time t, a penalty term is added to the sparsity coefficient bj, and S' is a positive integer.

2. The fault prediction system based on sensor data on a numerically controlled machine tool according to claim 1, wherein the controller is a single-chip microcomputer, a programmable logic controller, an field-programmable gate array processor or an advanced reduced instruction set computer machine processor.

3. The fault prediction system based on sensor data on a numerically controlled machine tool according to claim 1, wherein the sensors are multiple temperature sensors, multiple vibration sensors, or multiple noise sensors;

the multiple temperature sensors are distributed at an interval on a temperature measurement portion on the numerical control machine tool; the multiple vibration sensors are distributed at an interval on a rotor of a servo motor of the numerical control machine tool, and the multiple noise sensors are distributed at an interval on a processing cutter of the numerical control machine tool;

data collected by each sensor and transmitted to the controller is regarded as one channel data of the multi-channel data.

4. The fault prediction system based on sensor data on a numerically controlled machine tool according to claim 1, wherein the controller is also connected to a display screen.

5. The fault prediction system based on sensor data on a numerically controlled machine tool according to claim 1, wherein the fault prediction system further comprises a monitoring equipment:

the controller and the monitoring equipment use a real-time transmission method to perform the transmission of modeling information via the TD-LTE network, wherein the modeling information comprises the sparse coefficient bj; when the controller and the monitoring equipment can be used to transmit the modeling information via a Bluetooth subnet 1, the controller construct an information link with the monitoring equipment through the Bluetooth subnet 1, and transfers some of the modeling information to the monitoring equipment via the information link; the monitoring equipment configure to display the modeling information.

6. The fault prediction system based on sensor data on a numerically controlled machine tool according to claim 1, wherein the fault prediction system further comprises a monitoring equipment:

wherein the controller and the monitoring equipment use the TD-LTE network to transfer modeling information wherein the modeling information comprises the sparse coefficient bj;

the controller further configured to detect that the operation of the monitoring personnel meets a set activation condition, obtain its own coordinate information, and transmit the modeling information to the monitoring equipment;

the monitoring equipment configured to obtain a coordinate information of the controller, and based on the coordinate information of the monitoring equipment, determine whether to activate a own Bluetooth communication module, to transmit feedback messages to the controller; the controller configured to activate its own Bluetooth communication module, perform negotiation on performance of modeling information transmission with the monitoring equipment, and transmit the modeling information to the monitoring equipment via a constructed information link.

7. A method for a fault prediction system based on sensor data on a numerically controlled machine tool, applied in the fault prediction system, wherein the modeling system comprises a controller, the method runs on the controller, and comprises the following steps:

Step 1: a plurality of sensors transmitting collected p-channel data to the controller through a multi-channel sensor interface circuit, and the controller converting a received p-channel data into tensor-data-one of p-channel, a number of the plurality of sensors is p, and p is a positive integer greater than or equal to 2, the tensor-data-one of p-channel comprising n number of sample data collected by the plurality of sensors, each sample data comprising data collected by the plurality of sensors at a certain sampling time, and wherein data format of i-th sample data Yi(t) being: Yi(t)= [Yi1(t), . . . , Yip(t)], t is the sampling time of the i-th sample data; Yi(t) can be expressed by formula (1):

$$Yij(t) = Xij(t) + \varepsilon ij(t) \qquad (1)$$

Xij(t) is a signal function of the collected data of jth channel, εij(t) is a noise function of the collected data of the jth channel, i is a positive integer less than or equal to N, j is a positive integer less than or equal to p, Yij(t) represents the collected data of the j-th channel at a sampling time t;

Step 2: setting the data format of a tensor-data-two of the p channel Xi(t) as: Xi(t)=[Xi1(t) . . . , Xip(t)], wherein the tensor-data-two of the p channel Xi(t) is divided into L sample subspaces Sl, l=1, 2, . . . , L, L is a positive integer, in the same sample subspace, the signal functions representing each signal have cross-correlation, the signal functions of each signal in different sample subspaces have no correlation;

Step 3: setting each sample subspace Sl as a linear superposition of Φl: Φl=[Φl1(t), . . . , Øldl(t)] of dl basis functions, as shown in formula (2):

$$Sl \triangleq \left\{ X(t) \middle| X(t) = \sum_{q=1}^{dl} a_q \phi lq(t), a_q \in R \right\} \qquad (2)$$

for all signal functions Xij(t), i=1, . . . , N, the sample subspace to which Xij(t) belongs remains unchanged, while the basis coefficients corresponding to Xij(t) are different, and αijk is k-th component of the basis coefficient αij, where k is a positive integer less than or equal to dl;

wherein Xl={Xj(t)|Xj(t)∈ Sl, j=1, . . . , p}, Xl is signal of respective sample subspaces, wherein q and dl are both positive integers, and αq is a set real number, R is a set of real numbers;

Step 4: obtaining formula (3) for each signal Xij(t)∈ Xl:

$$X_{ij}(t) = \sum_{X_{ir}(t) \in X_l} b_{jr} X_{ir}(t) \qquad (3)$$

that is, Xij(t) is a signal function in Xl, which can be expressed as a linear combination of other pl−1 signals in this sample subspace, r is a positive integer, and bjr is the rth component of a sparse coefficient;

Step 5: using the Lq norm to minimize an objective function to limit solution set for solution of a sparse coefficient bj;

the restriction conditions for using the Lq norm to minimize the objective function to limit the solution set for the solution of the sparse coefficient bj are as shown in the formula group (4):

$$\begin{cases} \min \|b_j\|_q \\ \text{subject to } X_{ij}(t) = X_i(t)b_j, \, b_{jj} = 0 \end{cases} \qquad (4)$$

wherein q is the set integer value, which can take the value 1;

using convex programming tools such as the formula (5) group to effectively solve the sparse coefficient bj, s in the formula (5) group is a sampling time after the time t:

$$\begin{cases} \min \|b_j\|_1 + \frac{1}{2}\sum_{i=1}^{N} \int Z_{ij}(t) r_j(t,s)^{-1} Z_{ij}(s) dt ds \\ \text{subject to } Z_{ij}(t) = Y_{ij}(t) - Y_i(t) b_j, \ b_{ij} = 0 \end{cases} \quad (5)$$

In this way, the sparsity coefficients bj can be obtained, j=1, ..., p, so that the sparse coefficient bj that reflects the cross-correlation performance of the running state of the numerically controlled machine tool can be obtained, to implement equipment failure prediction of the numerically controlled machine tool;

Step 6: setting the collected data of the j-th channel has a total of S'−1 change points τs, s=1, ..., S'−1, for each change point as a dividing point:

$$Y_{ij}^s(t) = X_{ij}s(t) + \varepsilon_{ij}(t) \quad (6)$$

among them, $X_{ij}^s(b)$ is a signal function of the change point τs of the j-th channel, $\varepsilon_{ij}(t)$ is a noise function of the collected data of the j-th channel, $Y_{ij}^s(t)$ represents the change point τs of the j-th channel at the sampling time t, a penalty term is added to the sparsity coefficient bj, and S' is a positive integer.

8. The method of a fault prediction system based on sensor data on a numerically controlled machine tool according to claim 7, wherein the method of adding a penalty term to the sparsity coefficient bj is in the combined fusion LASSO as expressed in formula (7), λ1 is the coefficient one of the set penalty term, and λ2 is the coefficient two of the set penalty term:

$$\min \lambda_1 \int \left\| \frac{db_j(t)}{dt} \right\|_1 dt + \lambda_2 \int \|b_j(t)\|_1 dt + \frac{1}{2}\sum_{i=1}^{N} \int Z_{ij}(t) \Gamma_j(t,s)^{-1} Z_{ij}(s) dt ds, \quad (7)$$

$$\text{subject to } Z_{ij}(t) = Y_{ij}(t) - Y_i(t) b_j, \ b_{jj} = 0$$

as a result, dynamic modeling of the subspace correlation of the samples can be obtained and the modeling information can be displayed on the display screen, so that equipment fault subspace of the multi-channel data can be calculated.

\* \* \* \* \*